Patented May 16, 1950

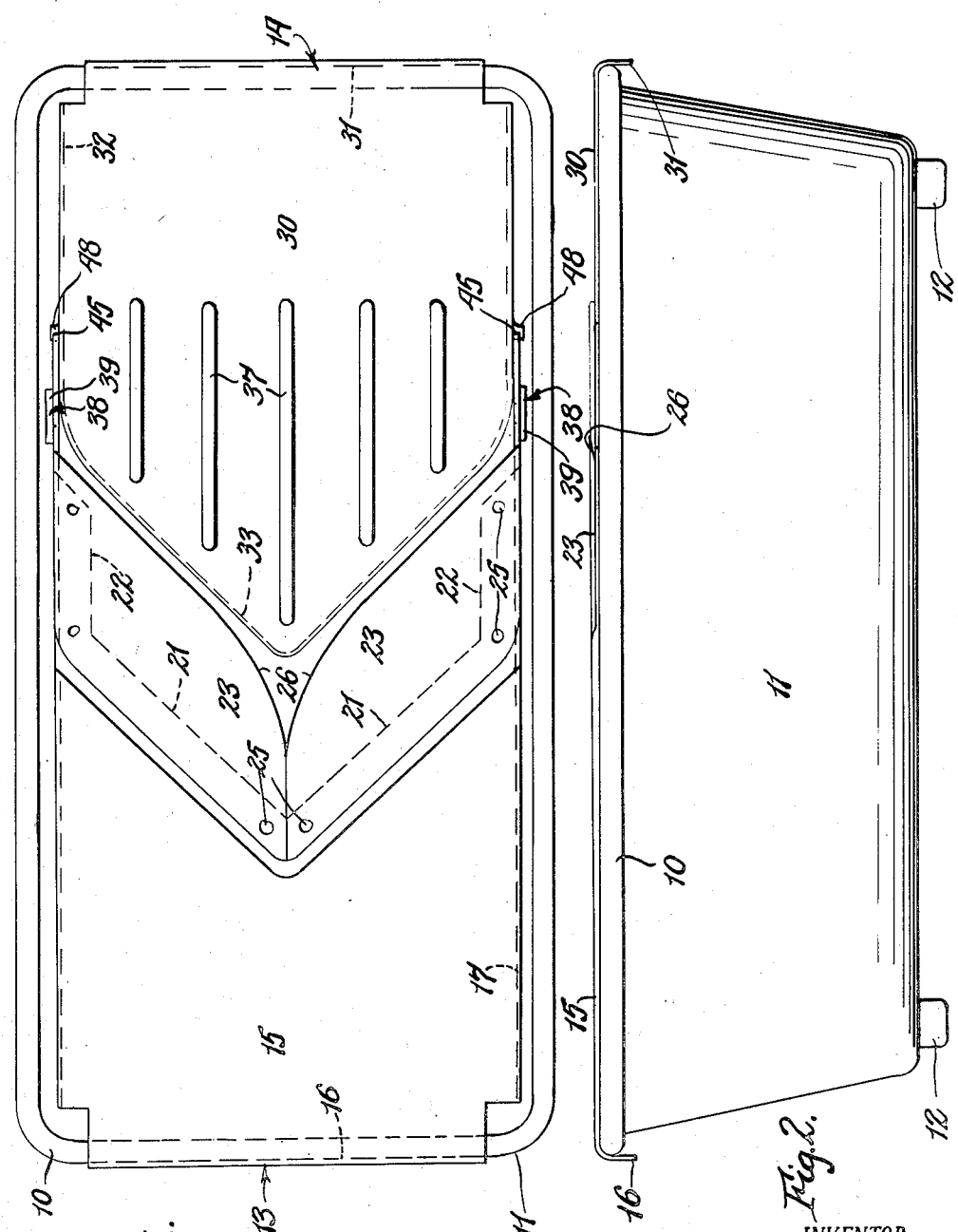

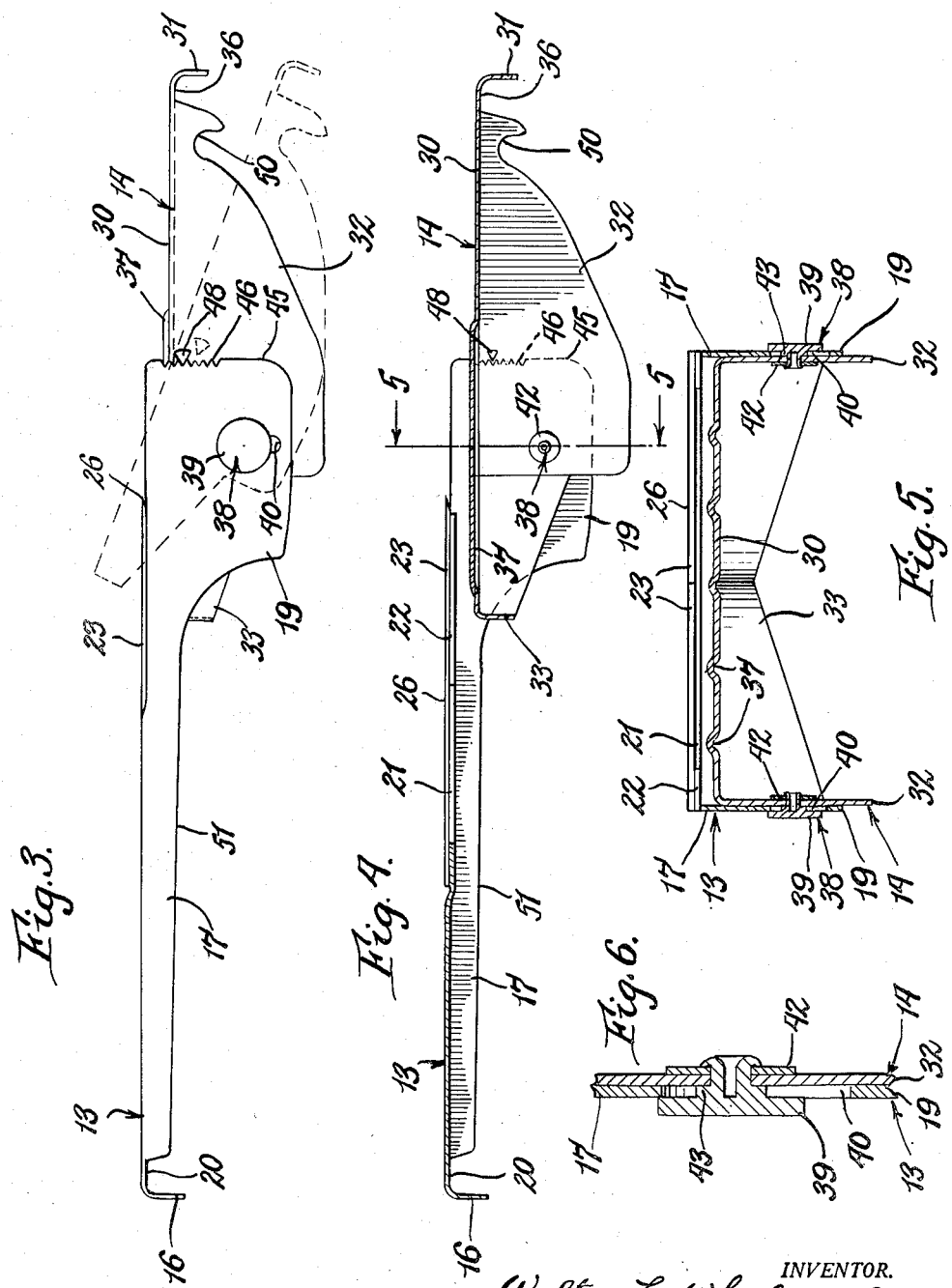

2,508,320

UNITED STATES PATENT OFFICE 2,508,320

SLICER HAVING A STATIONARY CUTTER

Walter L. Wheelwright, Buffalo, N. Y.

Application September 26, 1946, Serial No. 699,413

4 Claims. (Cl. 146—171)

This invention relates to a slicer, and more particularly to a slicer adapted for slicing vegetables and fruits.

One of the objects of the present invention is to provide such a slicer which can be used to rapidly reduce a whole fruit or vegetable into slices of uniform thickness and in which each slice is smooth and of attractive appearance when served.

Another object of the invention is to provide such a slicer which can be readily adjusted to produce slices of any desired thickness.

Another object is to provide such a slicer which can readily be fitted over a pan or bowl of any usual shape, which serves as a support for the slicer and as a receiver for the slices.

Another object of the invention is to provide such a slicer which is sturdy in construction and which, in particular, will maintain any set adjustment until deliberately readjusted.

Another aim of the invention is to provide such a slicer which can be produced of sheet metal at low cost.

Other objects and advantages of the invention will appear from the following description and drawings in which:

Fig. 1 is a top elevation of a slicer embodying the present invention and shown as mounted on the rim of a generally rectangularly shaped pan.

Fig. 2 is a side elevation thereof.

Fig. 3 is a view similar to Fig. 2 but showing the slicer removed from the pan.

Fig. 4 is a vertical, longitudinal generally central section therethrough.

Fig. 5 is a cross sectional view taken on line 5—5 Fig. 4.

Fig. 6 is a fragmentary enlarged view similar to Fig. 5 and in particular showing the rivet and slot connection between the two sections of the slicer.

In Figs. 1 and 2, the slicer embodying the present invention is shown as being mounted on the beaded rim 10 of a pan 11 which is of generally rectangular shape and is also shown as provided with four feet 12 which can be made of rubber or the like to prevent slipping of the pan on the work table while the slicer is being used.

This slicer is shown as comprising two main sheet metal sections 13 and 14 which are pivotally connected and vertically adjustable with reference to each other to adjust the slicer to the desired thickness of the slice removed by the knife or knives provided on one of the sections. A feature of the invention resides in the provision of separate means whereby the upper surfaces of these two sections are maintained in parallelism with each other at all adjustments so that a whole fruit or vegetable can readily and rapidly be reduced into a plurality of parallel-sided slices, each of which is of uniform thickness throughout.

The section 13 is preferably made of a single piece of sheet metal formed to provide a top plate 15, a depending end flange 16 and depending side flanges 17. These side flanges, at the end of the section opposite from the depending end flange 16, extend longitudinally a substantial distance beyond the end of the top plate 15 and are also formed to extend downwardly to form a pair of depending ears 19. A space 20 is also preferably provided between the depending end flange 16 and each of these side flanges 17 for a purpose which will hereinafter appear.

At its edge 21 opposite from the depending end flange 16 the top plate 15 is shown as being V-shaped in plan with side extensions 22 which extend alongside the upper edge of the corresponding side flange 17 to a point short of the extremity thereof. Along this edge 21 and the side extensions 22, the top plate 15 is also offset downwardly to provide a continuous offset flange for mounting the blade or blades 23 of the slicer, the degree of offset of this continuous flange being such as to render the top face of the blade or blades 23 coplanar with the supper surface of the top plate 15. The blade or blades 23 can be of any suitable form and are shown as being in the form of a pair of blades secured in V-formation to the continuous offset flange by spot welds 25 so as to provide a V-shaped horizontal cutting edge 26 which is coplanar with the upper surface of the top plate 15, as best shown in Fig. 1. These blades 23 extend beyond the extremities of the extensions 22 so that their effective cutting edge extends from one side flange 17 to the opposite side flange 17.

The section 14 is preferably made of a single piece of sheet metal formed to provide a top plate 30, a depending end flange 31 and depending side flanges 32. The end of the section 14 opposite from the depending end flange 31 is of V-shaped form in plan to generally conform to the V-shaped cutting edge 26 of the knife blades 23. This V-shaped end is also preferably reinforced by a V-shaped depending flange 33, the extremities of which form forward continuations of the side flanges 32, as best shown in Fig. 4. A space 36 is provided between the depending end flange 31 and each of the side flanges 32, for a purpose which will presently appear, and the top plate 30 is also shown as provided with a plurality of transversely spaced upwardly projecting beads 37, these beads being for the purpose of facilitating the sliding of the fruit or vegetable to be sliced along the upper surface of the top plate 30 by relieving suction tendencies and into engagement with the cutting edge 26 of the blades.

The flanges 32 of the section 14 are closely fitted between the depending ears 19 of the section 13 and are pivotally and slidingly connected to these ears by sliding rivets 38. Each of these rivets is shown as having a large head 39 which is slidingly fitted against the external face of the corresponding ear 19 and as having a hollow stem extending through a vertical slot 40 provided in the corresponding side flange 32 of the section 14. The inner extremity of this stem is also shown as extending through a washer 42 which is in contact with the inner face of the corresponding side flange 32 and is upset so as to hold the rivet in position. The stem of the rivet is also provided adjacent its head 39 with a circular enlargement 43 corresponding to the width of the slot 40 and serving to prevent the head from binding against the corresponding ear 19 and insure ready movement of the stem of the rivet along the slot 40. The rivets 38 are axially in line with each other so that the section 14 can be swung from the full to the dotted line position shown in Fig. 3.

The vertical edge 45 at the extremity of each ear 19 is formed to provide a series of uniformly spaced serrations or notches 46 which determine the adjustment of the relative vertical positions of the sections 13 and 14, thereby to determine the thickness of the slice removed from the fruit or vegetable. For this purpose each of the side flanges 32 of the section 14 is formed to provide a tooth 48 which is shown as being struck out from the body of the corresponding side flange 32 and as having a horizontally extending pointed extremity which is adapted to fit in each of the serrations or notches 46 of the section 13. It will also be particularly noted that the two teeth 48 are at a higher elevation than the rivets 38, this being necessary to permit disengagement and reengagement of these teeth 48 with the serrations or notches 46 in adjusting the slicer to produce slices of desired thickness.

In use, it is desirable to set the slicer upon the rim of a receptacle in which the slices fall after being severed by the cutting edge 26. If marketed as a unit with such a receptacle, the receptable can be of generally rectangular form as shown in Figs. 1 and 2, and the opposite extremities of the rim 10 of this receptacle can be engaged in the notches or spaces 20, 36 provided between the end depending flanges 16 and 31 of this slicer and the corresponding side flanges 17, 32. In the event however, that the housewife desires to fit the slicer upon a receptacle of smaller size or desires to fit the same upon a round or oval bowl, the side flanges 32 are provided with notches 50 and the lower edges 51 of the side flanges 17 are straight and parallel with the top plate 15.

In the operation of the slicer, the housewife determines the thickness of the slices desired and makes a corresponding adjustment of the slicer. This is done by the simple expedient of rotating the sections 13 and 14 about the axis of the rivets 38 so that the section 14 assumes the dotted line position shown in Fig. 3. Since the two teeth 48 of the section 14 are located at a higher elevation than the rivets 38, it will be seen that by so rotating the section 14 to the dotted line position shown in Fig. 3, the two teeth 48 are moved out of engagement with the serrations or notches 46 provided on the vertical edge 45 of the ears 19 of the section 13. Since the two teeth 48 of the section 14 are free from engagement with the serrations or notches 46 of the section 13, it will be seen that the sections 13 and 14 are free to be slid vertically relatively to each other to the extent permitted by the slots 40. Consequently, the housewife can slide the section 14 to the upper extremity of the slot 40 in which event swinging the section 14 back from the dotted line to the full line position shown in Fig. 3 will cause the two teeth 48 to engage the uppermost serrations or notches 46 of the section 13. In this position the top plate 30 of the section 14 will be in the most closely spaced relation to the plane of the top plate 15 of the section 13. If the housewife selects one of the other teeth or notches 46, such as the particular notch illustrated in Figs. 3 and 4, the top plates 30 and 15 of the two sections will be returned to parallel relation but at a greater vertical spacing of their planes. Accordingly, by the selection of any of the notches 46 for engagement with the two teeth 48, any desired relative elevation of the top plates 15 and 30 of the two sections 13 and 14 can be obtained within the limits, of course, provided by the slots 40.

The housewife then mounts the slicer upon the rim of a suitable receptacle. Such a receptacle may be furnished with the slicer and can be of the form shown in Figs. 1 and 2, in which the generally rectangular rim of the receptacle fits between the depending end flanges 16 and 31 of the slicer and in the notches or spaces 20, 36 provided between these depending end flanges and the corresponding side flanges 17, 32 thereof. If the housewife desires to use a smaller receptacle, such as a round or oval bowl, the rim of such other receptacle is caught in the notches 50 provided in the side flanges 32 with the edges 51 of the side flanges 17 resting on the rim in the opposite side of such other receptacle. Since the notches 50 are spaced a substantial distance from the depending end flange 31, it will be seen that a substantial curvature in such other receptacle is accommodated, and since the edges 51 are straight and parallel with the top plate 15 it will be seen that these edges will fit bowls of various sizes.

After the slicer is so fitted upon a bowl or receptacle the whole fruit or vegetable is placed upon the top plate 30 of the section 14 and is slid back and forth longitudinally of this slicer past the cutting edge 26. Each time the whole fruit or vegetable moves against this cutting edge a slice is cut from the whole fruit or vegetable, the remaining body of this whole fruit or vegetable sliding along the top surface of the knives 23 and the top face of the top plate 15 of the section 13, these faces of the knives 23 and top plate 15 being coplanar so as to insure free movement. Upon the reverse movement of the whole fruit or vegetable it is returned to engagement with the top plate 30 of the section 14, this top plate being preferably provided with the upstanding beads 37 so as to reduce friction between the body of the fruit or vegetable and the top plate 30 of the section 14 when the body is again moved into cutting engagement with the knives 23.

The slice severed from the body of the whole fruit or vegetable passes beyond the V-shaped extremity of the section 14 and drops into the container 11 on which the slicer is mounted, as previously described.

It will particularly be noted that in all positions of adjustment of the two sections 13 and 14 the top plates 13 and 15 are maintained in parallel relation with each other. This not only facilitates the operation of the slicer by insuring a smooth transfer of the body of the fruit or vegetable from the top plate 30 to the top plate 15, but also prevents any tendency to strip or rip the slice from the whole fruit or to crowd the slice under the blade or blades. As a result, the slices are easily produced in the cleanest and most appetizing form and have a uniform thickness.

From the foregoing it will be seen that the present invention provides a very sturdy and low-priced slicer, particularly for fruit or vegetables in household use, which produces uniform slices of any desired thickness and which can be fitted upon any type of container which the housewife wishes to use.

I claim as my invention:

1. A slicer for fruit, vegetables and the like, comprising a body including two sections each having a top plate and integral depending side flanges interfitted with one another, one of said top plates terminating in a cutting edge opposing the other top plate, a pair of coaxial pivot pins rigidly fixed to and projecting laterally from the flanges of one of said sections into vertical slots provided in the flanges of the other section whereby said sections are pivotally connected and can be moved vertically relative to each other to vary the thickness of the slice cut from a fruit or vegetable slid back and forth on the upper surfaces of said top plates, and means remote from said pivot pins for interlatching said flanges to hold said top plates of said sections in parallel relation in different positions of adjustment of said pivot pins comprising a horizontal tooth on one of said flanges projecting transversely of the adjacent pivot pin and adapted to engage any one of a vertical series of opposing notches provided on the adjacent side flange of the other section.

2. A slicer for fruit, vegetables and the like, comprising a body including two sections each having a top plate and integral depending side flanges interfitted with one another, one of said top plates terminating in a cutting edge opposing the other top plate, a pair of coaxial pivot pins rigidly fixed to and projecting laterally from the flanges of one of said sections into vertical slots provided in the flanges of the other section whereby said sections are pivotally connected and can be moved vertically relative to each other to vary the thickness of the slice cut from a fruit or vegetable slid back and forth on the upper surfaces of said top plates, and means remote from said pivot pins for interlatching said flanges to hold said top plates of said sections in parallel relation in different positions of adjustment of said pivot pins comprising a horizontal tooth on one of said flanges carrying a corresponding one of said pivot pins and projecting transversely of the axis thereof and adapted to engage one of a vertical series of opposing notches provided on the adjacent side flange of the other section and said tooth being arranged at a substantially higher elevation than its companion pivot pin to permit oscillation of said sections about said pivot pins to free said tooth from said notches and thereby permit vertical adjustment of said pins in said notches.

3. A slicer for fruit, vegetables and the like, comprising a body including two sections, one of said sections having a top plate terminating in a cutting edge and integral depending side flanges projecting horizontally beyond said cutting edge and provided in said projecting portions with vertical slots which aline with each other, the other of said sections being provided with a top plate having one end opposing said cutting edge and integral depending side flanges interfitting the side flanges of said first section, a pair of pins rigidly secured to the flanges of said last section and projecting into said slots and a tooth extending laterally from each of its flanges at a substantially higer elevation than said pivot pins and projecting horizontally toward the corresponding pivot pin to engage one of a vertical series of adjusting notches provided in the vertical end edge of the corresponding projecting portion of the adjacent depending side flange of said first section, said teeth permitting the opposite ends of said sections to be swung downwardly from their operative position around and relative to said pivot pins to free said tooth from engagement with said notches and thereby permit said pivot pins to be moved vertically in said slots to effect engagement of said teeth with other of said notches on restoring said sections to said operative positions.

4. A slicer for fruit, vegetables and the like, comprising a body including two sections each having a top plate and integral depending side flanges interfitted with one another, one of said top plates terminating in a cutting edge opposing the other top plate, a pair of coaxial pivot pins rigidly fixed to and projecting laterally from the flanges of one of said sections into vertical slots provided in the flanges of the other section whereby said sections are pivotally connected and can be moved vertically relative to each other to vary the thickness of the slice cut from a fruit or vegetable slid back and forth on the upper surfaces of said top plates, and means remote from said pivot pins for interlatching said flanges to hold said top plates of said sections in parallel relation in different positions of adjustment of said pivot pins comprising a horizontal tooth on one of said flanges carrying a corresponding one of said pivot pins and projecting transversely of the axis thereof and adapted to engage one of a vertical series of opposing notches provided on the adjacent side flange of the other section and said tooth being arranged at a substantially higher elevation than its companion pivot pin to permit oscillation of said sections about said pivot pins to free said tooth from said notches and thereby permit vertical adjustment of said pins in said notches the said side flanges of one of said sections being formed to provide opposite notches adapted to fit one side of the rim of a container on which said slicer is mounted and the said side flange of the other section being formed to provide a straight downwardly directed edge parallel with the companion top plate and adapted to rest on the other side of the rim of said container.

WALTER L. WHEELWRIGHT.

REFERENCES CITED

The following references are of record in the file of this patent:

UNITED STATES PATENTS

| Number | Name | Date |
|---|---|---|
| 161,920 | Witmer | Apr. 13, 1875 |
| 757,360 | Stevens | Apr. 12, 1904 |
| 1,079,226 | Emanuel | Nov. 18, 1913 |
| 1,767,389 | Morris | June 24, 1930 |
| 2,401,668 | Senkewitz | June 4, 1946 |

FOREIGN PATENTS

| Number | Country | Date |
|---|---|---|
| 62,545 | Austria | Dec. 10, 1918 |